United States Patent
Ou

(10) Patent No.: US 10,022,910 B2
(45) Date of Patent: Jul. 17, 2018

(54) ANCILLARY ADDITIVE MANUFACTURING SYSTEM

(71) Applicant: 3D Global Biotech Inc., Taipei (TW)

(72) Inventor: Keng-Liang Ou, Kaohsiung (TW)

(73) Assignee: 3D Global Biotech Inc., Taipei (TW)

( * ) Notice: Subject to any disclaimer, the term of this patent is extended or adjusted under 35 U.S.C. 154(b) by 553 days.

(21) Appl. No.: 14/624,120

(22) Filed: Feb. 17, 2015

(65) Prior Publication Data

US 2015/0360416 A1    Dec. 17, 2015

(30) Foreign Application Priority Data

Jun. 11, 2014 (TW) .............................. 103210261 U

(51) Int. Cl.
  *B29C 67/00*    (2017.01)
  *B33Y 10/00*    (2015.01)
  *B33Y 30/00*    (2015.01)

(52) U.S. Cl.
  CPC .......... *B29C 67/0059* (2013.01); *B33Y 10/00* (2014.12); *B33Y 30/00* (2014.12)

(58) Field of Classification Search
  CPC .......... B33Y 10/00; B33Y 30/00; B33Y 40/00
  See application file for complete search history.

(56) References Cited

U.S. PATENT DOCUMENTS

| 2003/0175410 A1 | 9/2003 | Campbell et al. |
| 2011/0169193 A1 | 7/2011 | Bonassar et al. |
| 2012/0156278 A1* | 6/2012 | Beretta ............ A61B 17/00491 424/443 |

FOREIGN PATENT DOCUMENTS

| KR | 20130120572 A | 11/2013 |
| WO | 2012118843 A1 | 9/2012 |

* cited by examiner

*Primary Examiner* — Ryan Ochylski
(74) *Attorney, Agent, or Firm* — C. G. Mersereau; Nikolai & Mersereau, P.A.

(57) ABSTRACT

The present invention provides an ancillary additive manufacturing system for manufacturing a reconstructed model simultaneously during the oral surgery to effectively reduce the time and healthcare human resources for the oral surgery. The ancillary additive manufacturing system comprises an input device and a printing body. The printing body is connected to the input device and comprises a base, an ink-manufacturing module, an inkjet head controlling unit, and multiple inkjet heads. The ink-manufacturing module is located above the base and comprises first, second, and third ink-manufacturing units. The inkjet head controlling unit is located above the base. The inkjet heads are mounted to the inkjet head controlling unit and point toward the base and comprise a first, second, and third inkjet head. The first, second, and third inkjet head correspondingly connected to the first, second, and third ink-manufacturing units.

6 Claims, 2 Drawing Sheets

ANCILLARY ADDITIVE MANUFACTURING SYSTEM

BACKGROUND OF THE INVENTION

1. Field of the Invention

The present invention relates to an ancillary additive manufacturing system, especially to an ancillary additive manufacturing system applied for manufacturing reconstructed model.

2. Description of the Prior Art(s)

Cancer is the top killer in modern society. Take Taiwan for example, cancer has continuously occupied the first position in death since 1982. Furthermore, the growth rate of oral cancer patients is the fastest among all kinds of cancer patients, with about 5400 new diagnosis cases and about 2300 deaths by oral cancer each year.

Currently, common oral cancer therapies include chemotherapy, radiotherapy, or oral surgery. The oral surgery comprises oral resection and oral reconstruction. The range of the oral resection depends on the cancer stage and may include cranial face, mandible, maxilla, etc. The oral reconstruction follows after the oral resection and includes craniofacial reconstruction, mandible reconstruction, maxilla reconstruction, etc. The common mandible reconstruction is made by fibula of calf. Therefore, doctors need to execute cancer cells resection and fibular osteotomy at the same time. Furthermore, the shape and size of fibula need redesign according to the range of the oral resection. Inasmuch as the preceding complex steps of the oral surgery, the oral surgery always takes more than 3 to 4 hours and lots of healthcare human resources. Besides, the long surgery time of the oral surgery also increases the risk of wound exposure of the patient.

A conventional additive manufacturing machine can easily and quickly manufacture prototype models through additive process. The doctor might use the conventional additive manufacturing machine for building the reconstruction model to shorten the overall surgery time. The conventional additive manufacturing machine only comprises one tank for loading the ink material and one inkjet head for producing the desired model; however, a desired model for reconstruction is typically consisted of multiple biomaterials. Therefore, the conventional additive manufacturing machine of the aforementioned features still fails to satisfy the requirements of the surgery and fails to manufacture the models with the desired output speed.

To overcome the shortcomings, the present invention provides an ancillary additive manufacturing system to mitigate or obviate the aforementioned problems.

SUMMARY OF THE INVENTION

The present invention provides an ancillary additive manufacturing system, which manufactures a model for oral reconstruction simultaneously during the oral surgery to effectively reduce the time and healthcare human resources for the oral surgery.

The ancillary additive manufacturing system comprises an input device and a printing body. The printing body is connected to the input device and comprises a base, an ink-manufacturing module, an inkjet head controlling unit, and multiple inkjet heads.

The ink-manufacturing module is located above the base and comprises a first manufacturing unit, a second manufacturing unit, and a third manufacturing unit; the first manufacturing unit comprises a bone cement tank; the second manufacturing unit is located between the first manufacturing unit and the third manufacturing unit and comprises a platelet rich plasma tank; the third manufacturing unit is located next to the second manufacturing unit and comprises a periodontal stem cell tank. The inkjet head controlling unit is located above the base. The inkjet heads are mounted to the inkjet head controlling unit and point toward the base. The inkjet heads comprise a first inkjet head, a second inkjet head, and a third inkjet head; the first inkjet head is connected to the bone cement tank; the second inkjet head is connected to the platelet rich plasma tank; the third inkjet head is connected to the periodontal stem cell tank.

The ancillary additive manufacturing system having the first, second and third ink-manufacturing units and the first, second and third inkjet heads can afford to manufacture the reconstruction model and can assist the doctor to shorten the overall surgery time.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
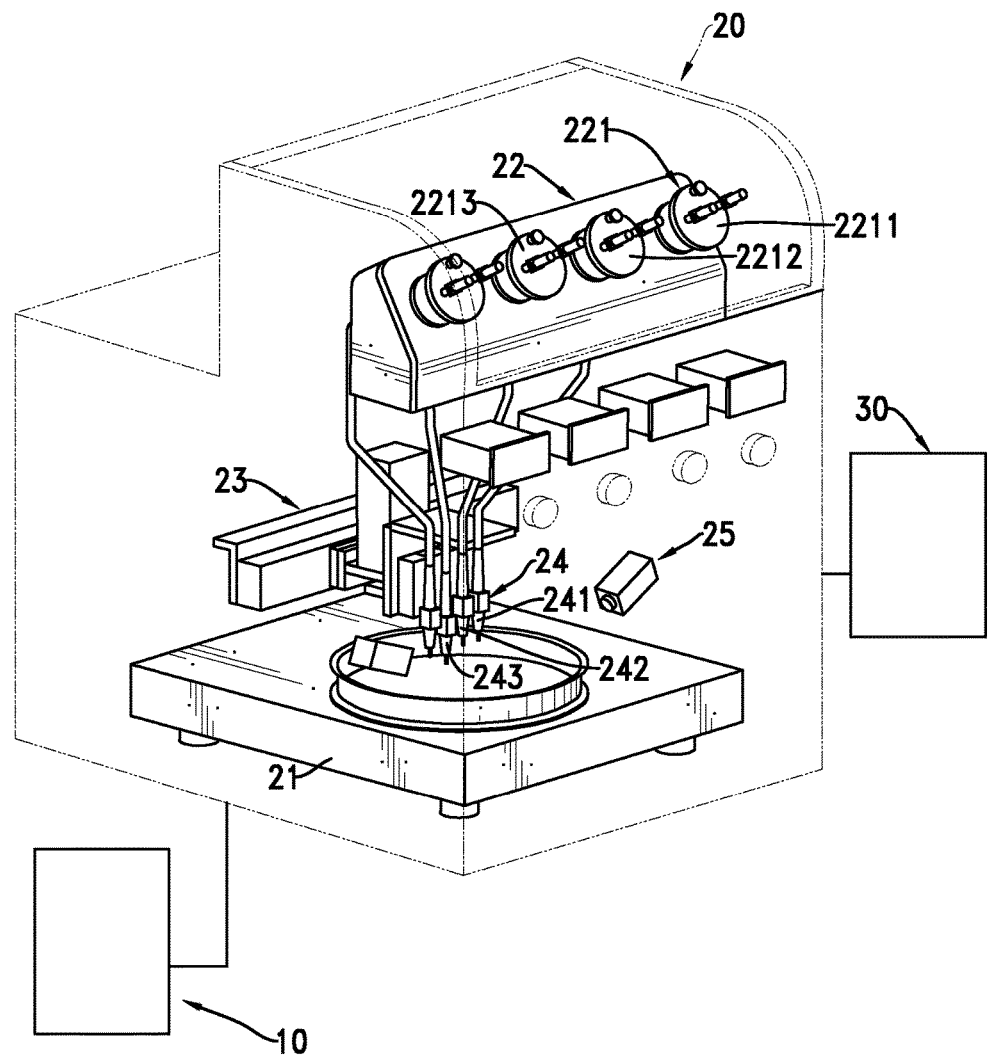
FIG. 1 is a perspective view of an ancillary additive manufacturing system in accordance with the present invention.
Figure 2:
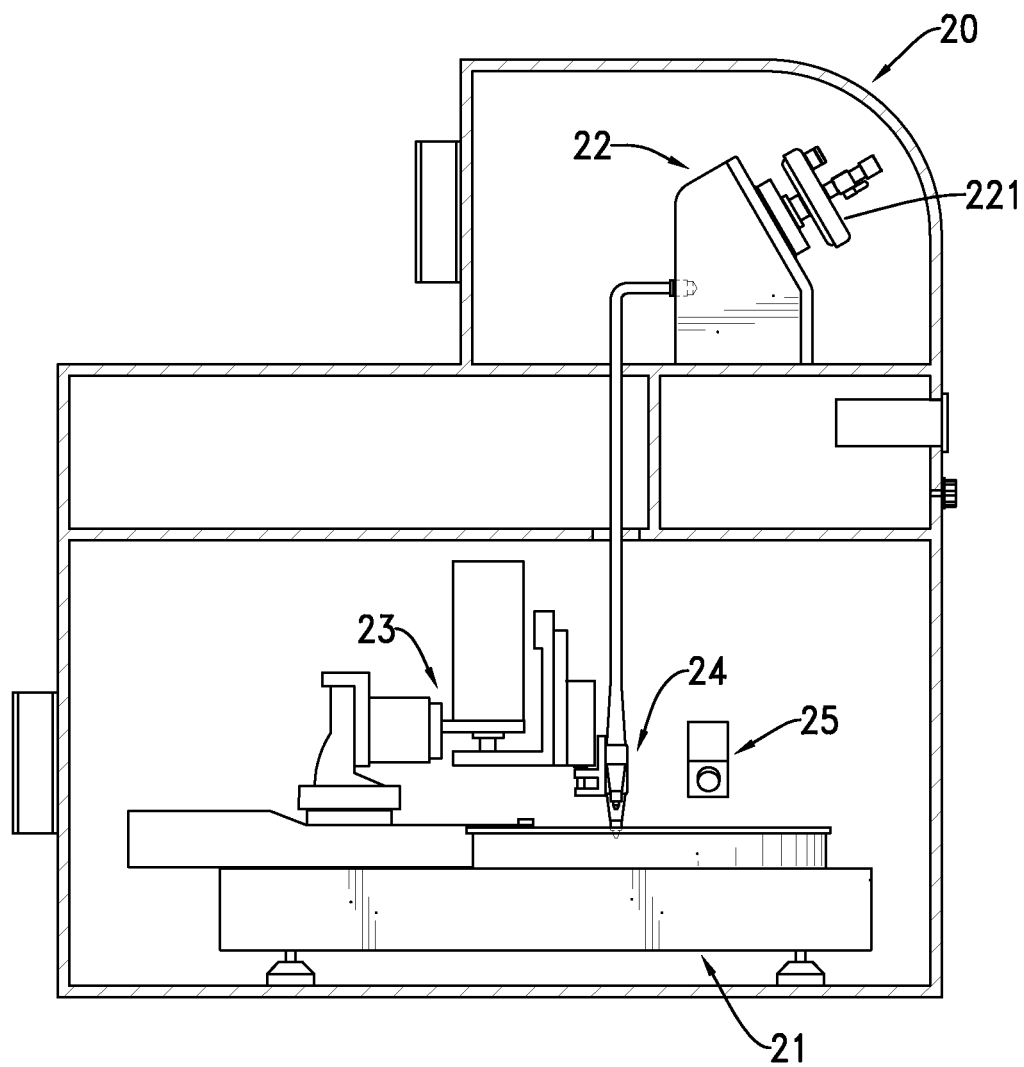
FIG. 2 is a side view of a printing body of the ancillary additive manufacturing system in FIG. 1.

With reference to FIG. 1 and FIG. 2, an ancillary additive manufacturing system in accordance with the present invention comprises an input device 10, a printing body 20, a computing device 30, and a temperature controlling unit.

In a preferable embodiment, the input device 10 is a personal computer for simulating data including the range of cancer cells for oral resection and the model of mandible for oral reconstruction prior to the oral surgery. The simulated data are then transferred to the printing body 20 via cable, wirelessly, or by other possible data transfer techniques.

The printing body 20 is connected to the input device 10 and comprises a base 21, an ink-manufacturing module 22, an inkjet head controlling unit 23, three inkjet heads 24, and a monitoring unit 25.

The base 21 is located at the bottom of the printing body 20 for supporting a reconstructed model produced by the ink-manufacturing module 22.

The ink-manufacturing module 22 is located above the base 21 and comprises multiple ink-manufacturing units 221, and the ink-manufacturing units 221 are loaded with raw materials of the reconstructed model produced by the ink-manufacturing module 22. In the preferable embodiment, the ink-manufacturing units 221 include a first manufacturing unit 2211, a second manufacturing unit 2212, and a third manufacturing unit 2213. The first manufacturing unit 2211 comprises a bone cement tank. The bone cement tank is loaded with bone cements and is next to the second manufacturing unit 2212. The second manufacturing unit 2212 is located between the first manufacturing unit 2211 and the third manufacturing unit 2213; and the second manufacturing unit 2212 comprises a platelet rich plasma tank (PRP tank). The PRP tank is loaded with platelet rich plasma (PRP). The third manufacturing unit 2213 is located next to the second manufacturing unit 2212 and comprises a periodontal stem cell tank (PSC tank). The PSC tank is loaded with periodontal stem cells (PSC). In a more preferable embodiment, the ink-manufacturing units 221 include a fourth manufacturing unit. The fourth manufacturing unit is next to the third manufacturing unit 2213 and comprises a cell-mixing tank and a cell-incubating tank. The cell-mixing tank can mix bone cements, PRP, PSC or other stem cells with variety ratio. The cell-incubating tank is next to the cell-mixing tank and can incubate bone cements, PRP, PSC or other stem cells.

The bone cements are for constructing the cytoskeleton of the reconstructed model produced by the additive manufacturing system. The bone cements are made from calcium phosphate and are highly compatible with soft or hard tissues. Furthermore, the bone cements can be conducted in the reconstruction of bone tissues.

The PRP contains abundant growth factors that can accelerate the regeneration of bone tissues and evaluate density of bone. In a preferable embodiment, the PRP and the periodontal stem cells are prepared from the patient of the oral surgery to avoid immune response. Furthermore, the simultaneous use of the PRP and the periodontal stem cells improve the effect of osteointegration, which increase the performance of fibronectin, osetonectin, and vitronectin and have excellent osteoconductive effect and osteoinductive effect.

The inkjet head controlling unit 23 is located above the base 21. In the preferable embodiment, the inkjet head controlling unit 23 is located between the base 21 and the ink-manufacturing module 22 and the axial movement precision of the inkjet head controlling unit 23 is 0.01 millimeter.

The inkjet heads 24 are mounted to the inkjet head controlling unit 23 and point toward the base 21, and their positions relative to the base 21 are controlled by the inkjet head controlling unit 23. The inkjet heads 24 comprise a first inkjet head 241, a second inkjet head 242, and a third inkjet head 243; the first inkjet head 241 is connected to the bone cement tank; the second inkjet head 242 is connected to the platelet rich plasma tank; the third inkjet head 243 is connected to the periodontal stem cell tank.

The monitoring unit 25 is located above the base 21. In the preferable embodiment, the monitoring unit 25 is located between the base 21 and the ink-manufacturing module 22 for recording data such as images and factors of the reconstructed model produced by the ink-manufacturing module 22 in real time. Furthermore, the position of the monitoring unit 25 is automatically adjusted with the height of the reconstructed model produced by the ink-manufacturing module 22.

The computing device 30 is connected with the monitoring unit 25 to receive the recorded data from the monitoring unit 25 via cable, wireless, or by other possible data transfer techniques. Said computer device 30 is a personal computer for computing and analyzing the recorded data from the monitoring unit 25. The recorded data, after computation and analysis by the computing device 30, can be further used for clinical examination by a doctor of the oral surgery.

The temperature controlling unit is mounted to the printing body 20 and is consisted of an independent solid state cooling unit and a heat transfer network. The temperature controlling unit keeps the printing body 20 at 0 degree Celsius to maintain the survival of the PRP and the periodontal stem cells.

The procedure of the oral surgery with the ancillary additive manufacturing system in accordance with the present invention is as follows.

The range of cancer cells for oral resection and the model of mandible for oral reconstruction is firstly simulated in the input device 10 prior to the oral surgery to obtain a simulated data. While the doctor starts the oral surgery, the simulated data are transferred to the printing body 20. At the same time, the printing body 20 receives the simulated data from the input device 10 and begins to manufacture the model of mandible for oral reconstruction. The ink-manufacturing units 221 deliver the bone cements, the PRP, and the periodontal stem cells to the inkjet heads 24, and the inkjet head controlling unit 23 controls the inkjet heads 24 to a position above the base 21 where the model of mandible for oral reconstruction is to be made. The inkjet heads 24 respectively deposit the bone cement, the PRP, and the periodontal stem cells on the base 21 by frozen compressed deposit manufacturing method and soft plasma curing technique to produce the model of mandible for oral reconstruction. The inkjet heads 24 can construct the model of mandible for oral reconstruction by combination of frozen compressed deposit manufacturing method and soft plasma curing technique which, relative to the conventional additive manufacturing machine, can effectively sterilize and without damage the bone cements, the PRP, and the periodontal stem cells to ensure the completeness of the model of mandible for oral reconstruction. While depositing the model of mandible for oral reconstruction, the monitoring unit 25 records data such as images and factors of the model of mandible for oral reconstruction in real time and transfers the recorded data to the computing device 30. The recorded data, after computation and analysis by the computing device 30, can be further used in clinical examination by the doctor. After the oral resection is finished, the model of mandible for oral reconstruction is also done. Therefore, the doctor can directly install the model of mandible for oral reconstruction to the patient to reduce the time of the oral surgery, the risk of wound exposure of the patient, and the waste of healthcare human resources.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An ancillary additive manufacturing system comprising:
   an input device; and
   a printing body, the printing body connected to the input device and comprising
      a base;
      an ink-manufacturing module located above the base and comprising a first manufacturing unit, a second manufacturing unit, a third manufacturing unit, and a fourth manufacturing unit; wherein the first manufacturing unit comprises a bone cement tank loaded with bone cements; the second manufacturing unit is located between the first manufacturing unit and the third manufacturing unit and comprises a platelet rich plasma tank loaded with platelet rich plasma; the third manufacturing unit is located between the second manufacturing unit and the fourth manufacturing unit and comprises a periodontal stem cell tank loaded with periodontal stem cells; the fourth manufacturing unit is located next to the third manufacturing unit and comprises a cell-mixing tank and a cell-incubating tank next to the cell-mixing tank, wherein the cell-incubating tank is connected with the bone cement tank, the platelet rich plasma tank and the periodontal stem cell tank;

an inkjet head controlling unit located above the base; and multiple inkjet heads mounted to the inkjet head controlling unit and pointing toward the base, the inkjet heads comprising a first inkjet head, a second inkjet head, and a third inkjet head; wherein the first inkjet head is connected to the bone cement tank; the second inkjet head is connected to the platelet rich plasma tank; the third inkjet head is connected to the periodontal stem cell tank.

2. The ancillary additive manufacturing system as claimed in claim 1, wherein the ancillary additive manufacturing system further comprises a temperature controlling unit, the temperature controlling unit mounted to the printing body.

3. The ancillary additive manufacturing system as claimed in claim 2, wherein the temperature controlling unit is consisted of an independent solid state cooling unit and a heat transfer network.

4. The ancillary additive manufacturing system as claimed in claim 3, wherein the printing body further comprises a monitoring unit, the monitoring unit located above the base; the ancillary additive manufacturing system further comprises a computing device, the computing device connected to the monitoring unit.

5. The ancillary additive manufacturing system as claimed in claim 1, wherein the printing body further comprises a monitoring unit, the monitoring unit located above the base; the ancillary additive manufacturing system further comprises a computing device, the computing device connected to the monitoring unit.

6. The ancillary additive manufacturing system as claimed in claim 2, wherein the printing body further comprises a monitoring unit, the monitoring unit located above the base; the ancillary additive manufacturing system further comprises a computing device, the computing device connected to the monitoring unit.

* * * * *